US011616243B2

(12) United States Patent
Zhu et al.

(10) Patent No.: US 11,616,243 B2
(45) Date of Patent: Mar. 28, 2023

(54) TEMPERATURE CONTROL METHOD FOR VEHICULAR PROTON EXCHANGE MEMBRANE FUEL CELL SYSTEM

(71) Applicant: HAIDRIVER (QINGDAO) ENERGY TECHNOLOGY CO., LTD, Shandong (CN)

(72) Inventors: Wei Zhu, Shandong (CN); Wei Wu, Shandong (CN); Jiaping Xie, Shandong (CN)

(73) Assignee: HAIDRIVER (QINGDAO) ENERGY TECHNOLOGY CO., LTD, Shandong (CN)

( * ) Notice: Subject to any disclaimer, the term of this patent is extended or adjusted under 35 U.S.C. 154(b) by 0 days.

(21) Appl. No.: 17/558,385

(22) Filed: Dec. 21, 2021

(65) Prior Publication Data

US 2022/0200027 A1 Jun. 23, 2022

(30) Foreign Application Priority Data

Dec. 21, 2020 (CN) .......................... 202011517347.5

(51) Int. Cl.
*H01M 8/04* (2016.01)
*H01M 8/04701* (2016.01)
*H01M 8/04014* (2016.01)
*H01M 8/0432* (2016.01)
*H01M 8/04992* (2016.01)

(52) U.S. Cl.
CPC ... *H01M 8/04723* (2013.01); *H01M 8/04014* (2013.01); *H01M 8/04358* (2013.01); *H01M 8/04992* (2013.01); *H01M 2220/20* (2013.01)

(58) Field of Classification Search
CPC ......... H01M 8/04723; H01M 8/04014; H01M 8/04992; H01M 8/04358
See application file for complete search history.

(56) References Cited

U.S. PATENT DOCUMENTS 6,651,761 B1 * 11/2003 Hrovat .................... B60L 15/20
165/41

FOREIGN PATENT DOCUMENTS

CN 111129550 5/2020
CN 111403779 7/2020

* cited by examiner

*Primary Examiner* — Olatunji A Godo
(74) *Attorney, Agent, or Firm* — JCIP Global Inc.

(57) ABSTRACT

A temperature control method for a vehicular proton exchange membrane fuel cell system comprises the following steps: detecting a cooling loop inlet temperature of a fuel cell stack by using a temperature sensor, and inputting the temperature into a controller to achieve cooling fan control based on the controller, wherein the cooling fan control comprises fuzzy logic self-adaptive proportional integral control and feedforward compensation control, gain parameters of the proportional integral control are self-adaptively updated by a fuzzy logic algorithm, a load current of the fuel cell serves as disturbance and is used for feedforward compensation, and meanwhile, the opening degree of the fan is determined by the total cooling capacity requirement and the number of cooling fans; and finally, inputting a control signal output by the controller into an actuator of a thermal management subsystem, and conducting cooling inlet temperature control of the fuel cell stack.

4 Claims, 3 Drawing Sheets

TEMPERATURE CONTROL METHOD FOR VEHICULAR PROTON EXCHANGE MEMBRANE FUEL CELL SYSTEM

CROSS-REFERENCE TO RELATED APPLICATION

This application claims the priority benefit of China application no. 202011517347.5, filed on Dec. 21, 2021. The entirety of the above-mentioned patent application is hereby incorporated by reference and made a part of this specification.

BACKGROUND

Technical Field

The present invention belongs to the technical field of fuel cells, and in particular relates to a temperature control method for a vehicular proton exchange membrane fuel cell system.

Description of Related Art

As an important branch of new energy vehicles, a fuel cell vehicle is regarded as one of the final solutions of future vehicles due to the advantages of fast hydrogen injection speed, high system efficiency, low noise, zero emission, and the like. Due to the fact that a fuel cell operates under a dynamic load, temperature fluctuation of a fuel cell system has a significant impact on the performance and service life of an engine; a long-term ultra-low temperature condition is likely to cause a flooding phenomenon of a fuel cell stack, and long-term flooding failure may cause fuel starvation, finally leading to irreversible decline of a catalyst layer. Meanwhile, ultra-high temperature causes excessive thermal stress of an exchange membrane, and pinholes or cracks can be spontaneously formed under the stress effect, resulting in increase of a hydrogen permeation rate and a fluoride release rate, and finally leading to performance and durability reduction of the fuel cell. Therefore, a temperature of the fuel cell system needs to be accurately controlled.

The invention patent with publication number of [CN 111129550 A] discloses a PID control method for a fuel cell system. A traditional PID control algorithm is used for controlling a temperature of a fuel cell; however, the fuel cell is a complex nonlinear time-varying system, and the PID control algorithm with fixed parameters is hard to meet temperature control demands under complicated and changeable working conditions. The invention patent with publication number of [CN 111403779 A] discloses a model-based self-adaptive temperature control method. A cell stack temperature and a circulating coolant inlet temperature are controlled by regulating a cell stack coolant mass flow rate and a bypass valve opening coefficient; however, the model-based control method depends on an accurate mathematical model, but the accurate model is difficult to obtain, and the model is small in application range due to strong time-varying property of the fuel cell.

To this end, a temperature control method with wide applicability, strong robustness, small overshoot and fast temperature rise needs to be provided.

SUMMARY

To overcome defects in the prior art, the present invention provides a temperature control method for a vehicular proton exchange membrane fuel cell system, which can reduce temperature fluctuation of a vehicular fuel cell engine during operation, improve system performance, and prolong service life of the system.

The present invention is achieved by adopting the following technical solutions: a temperature control method for a vehicular proton exchange membrane fuel cell system comprises the following steps:

step S1, measuring a coolant inlet temperature of a cell stack;

step S2, evaluating a difference between a target coolant inlet temperature and an actually measured coolant inlet temperature to obtain a temperature deviation value;

step S3, inputting the temperature deviation value and the actually measured coolant inlet temperature into a proportional integral (PI) control module to obtain a control quantity of a cooling fan, wherein the control quantity comprises a rotation speed of the cooling fan, and the PI control module comprises a proportional integral PI module and a fuzzy logic module specifically as follows:

the proportional integral PI module is used for obtaining the rotation speed of the cooling fan by calculation, and the fuzzy logic module is used for adjusting PI parameters in real time according to the temperature deviation value and a variation quantity of the temperature deviation value, an input membership function of the fuzzy logic module is described by a triangular distribution, output of the fuzzy logic module is a proportional parameter correction and an integral parameter correction, an output membership function is described by Gaussian distribution, and a centroid method is adopted for output calculation; and step S4, inputting the control quantity of the cooling fan obtained in the step S3 into a cooling system controller through a control unit of a fuel cell system to achieve temperature control of the fuel cell system.

Further, in the step S3, in consideration of a large difference value between the target coolant inlet temperature and the actually measured coolant inlet temperature in the initial warming-up process, the following processing is specifically conducted:

introducing an integral separation method in the proportional integral PI module to separate the integral in the proportional integral PI module in the initial warming-up process, specifically as follows:

1) setting a threshold value ε for controlling deviation according to actual system control requirements;

2) when the target coolant inlet temperature is the initial warming-up temperature and the difference value between the target coolant inlet temperature and the actually measured coolant inlet temperature is greater than the threshold value ε, adopting proportional control to avoid adverse impact of the integral as well as make the system have faster dynamic response; and 3) in the target coolant inlet temperature reduction process, to avoid downward overshoot of the temperature, not starting the proportional integral PI module in the cooling process, maintaining a current opening degree of the cooling fan unchanged until the difference value between the actually measured coolant inlet temperature and the target coolant inlet temperature is less than a certain threshold value, and then starting the proportional integral PI module to adjust the rotation speed of the cooling fan in real time.

Further, in the step S3, the rotation speed is regulated in advance through the cooling fan under a working condition that the load current changes is greater than 10 A, the load current is regarded as disturbance to be used for compensation calculation, and then a compensation calculation result is integrated with a fuzzy logic module output result:

when the compensation action needs to be started, a disturbance-based feedforward compensation control expression is as follows:

$$u(t)_{fed}=k_c I$$

wherein $k_c$ is a feedforward control parameter;

a total opening degree output control expression of the cooling fan is as follows:

$$u(t)=k_c I+(k_{p\_c}+\Delta k_{p\_FL})e(t)\pm(k_{i\_c}+k_{i\_FL})\int_0^t e(t)dt.$$

Further, in the step S3, before inputting an obtained total opening degree output control value of the cooling fan into a controller of a cooling subsystem, the total opening degree control output quantity is limited, so that an upper control duty ratio of each cooling fan is 90%.

Further, the step S3 further comprises a step of distributing the cooling fans, so that the output duty ratio is averagely distributed, with specific principles as follows:

when the PI output duty ratio D is that D is equal to or greater than 0 and is less than 5%, no cooling fan is started;

when the PI output duty ratio is that D is equal to or greater than 5 and is less than 15%, the duty ratio of each cooling fan is 15%, and one cooling fan is started;

when the PI output duty ratio is that D is equal to or greater than 15% and is less than 30%, the duty ratio of each cooling fan is D, and one cooling fan is started;

when the PI output duty ratio is that D is equal to or greater than 30% and is less than 60%, the duty ratio of each cooling fan is D/2, and two cooling fans are started;

when the PI output duty ratio is that D is equal to or greater than 60% and is less than 90%, the duty ratio of each cooling fan is D/3, and three cooling fans are started;

when the PI output duty ratio is that D is equal to or greater than 90% and is less than 120%, the duty ratio of each cooling fan is D/4, and four cooling fans are started;

when the PI output duty ratio is that D is equal to or greater than 120% and is less than 150%, the duty ratio of each cooling fan is D/5, and five cooling fans are started;

when the PI output duty ratio is that D is equal to or greater than 150% and is less than 180%, the duty ratio of each cooling fan is D/6, and six cooling fans are started;

when the PI output duty ratio is that D is equal to or greater than 180% and is less than 210%, the duty ratio of each cooling fan is D/7, and seven cooling fans are started; and when the PI output duty ratio is that D is equal to or greater than 210% and is less than 240%, the duty ratio of each cooling fan is D/8, and eight cooling fans are started.

Compared with the prior art, the present invention has the following advantages and beneficial effects:

(1) the solution method does not need to establish a fuel cell system model, so that a tedious process for model identification is avoided.

(2) a fuzzy logic PI algorithm is adopted, and the fuzzy logic is adjusted at any time according to actual conditions;

(3) by adopting feedforward compensation, the temperature fluctuation can be further reduced compared with the traditional PID control algorithm;

(4) the temperature fluctuation can be further reduced by considering the integral separation effect of heating and the closing effect of the proportional integral calculation algorithm of cooling; and (5) the average distribution of the cooling fans is taken into consideration, so that frequent start and stop of certain fans are avoided, and the inconsistency of the service life of the cooling fans is reduced.

DESCRIPTION OF THE EMBODIMENTS

To understand the objective, features and advantages of the present invention more clearly, the present invention is further described below with reference to accompanying drawings and embodiments. Numerous specific details are set forth in the following description to facilitate a thorough understanding to the present invention, however, the present invention may be implemented in other ways than those described herein and is therefore not limited to the specific embodiments disclosed below.

Figure 1:
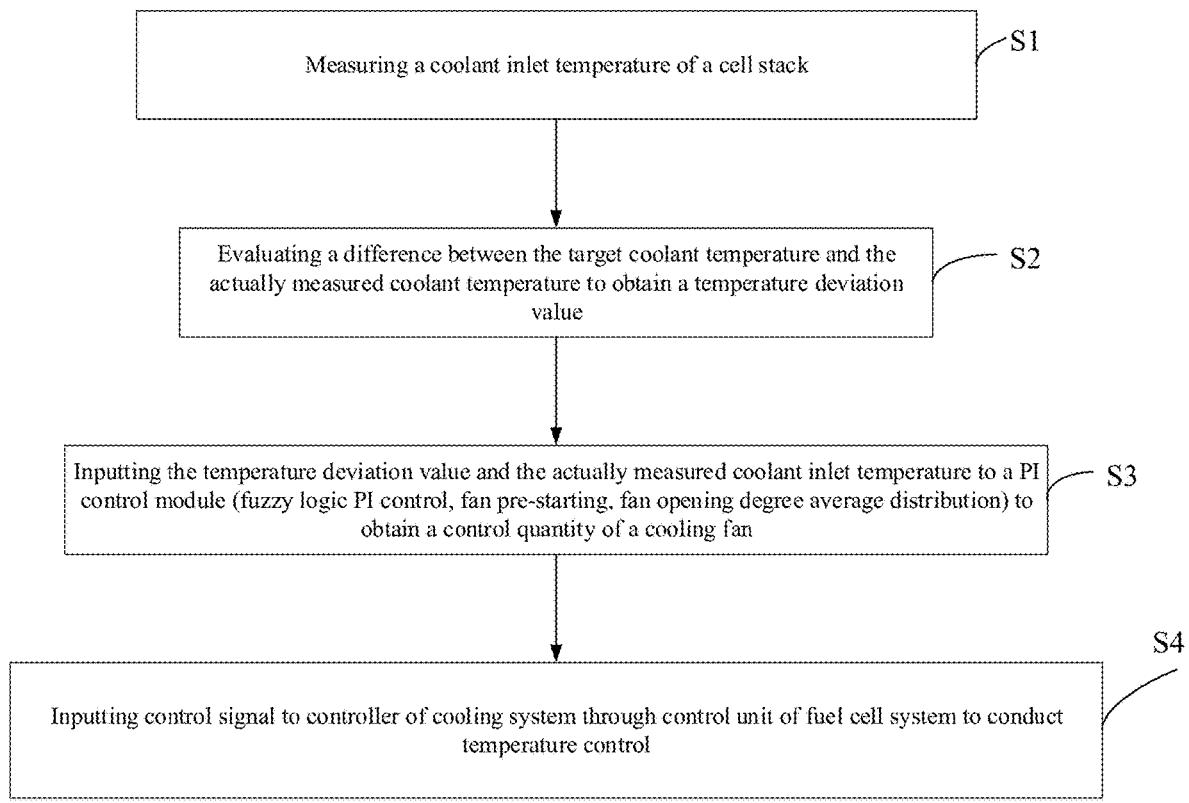
FIG. 1 is a flow diagram of a temperature control method of an embodiment of the present invention.

The embodiment provides a temperature control method for a vehicular proton exchange membrane fuel cell system, as shown in FIG. 1, comprising the following steps:

step S1, measuring a coolant inlet temperature of a cell stack, and setting a target coolant inlet temperature;

step S2, calculating a temperature deviation, evaluating a difference between an actual value measured by a temperature sensor (an actually measured coolant inlet temperature) and a target set value (the target coolant inlet temperature) to obtain a temperature deviation value, and serving the temperature deviation as an input of a PI control module;

step S3, inputting the temperature deviation value and the actually measured coolant inlet temperature into the PI control module to obtain a control quantity of a cooling fan, wherein the control quantity comprises a rotation speed of the cooling fan; and step S4, inputting the control quantity of the cooling fan obtained in the step S3 to a cooling system controller through a control unit of a fuel cell system to achieve temperature control of the fuel cell system.

In the step S1, the temperature sensor is used for detecting the coolant inlet temperature of a fuel cell stack, and the coolant inlet temperature is used as a control target for temperature stabilizing control. To prevent a fuel cell engine controller from transmitting an abnormal set value, the target coolant inlet temperature (set value) needs to be limited, and the specific working temperature range is based on that provided by a cell stack manufacturer. The target temperature is determined by the magnitude of the working current of the cell stack, and the most appropriate operating temperature under different operating currents can be found through experimental calibration generally; meanwhile, the temperature difference of a coolant inlet and a coolant outlet needs to be within a certain range and generally needs to be controlled within 5-10° C., and the specific temperature difference is determined by a cell stack supplier and can be specifically set according to actual conditions, which would not be repeatedly described in detail here.

Figure 2:
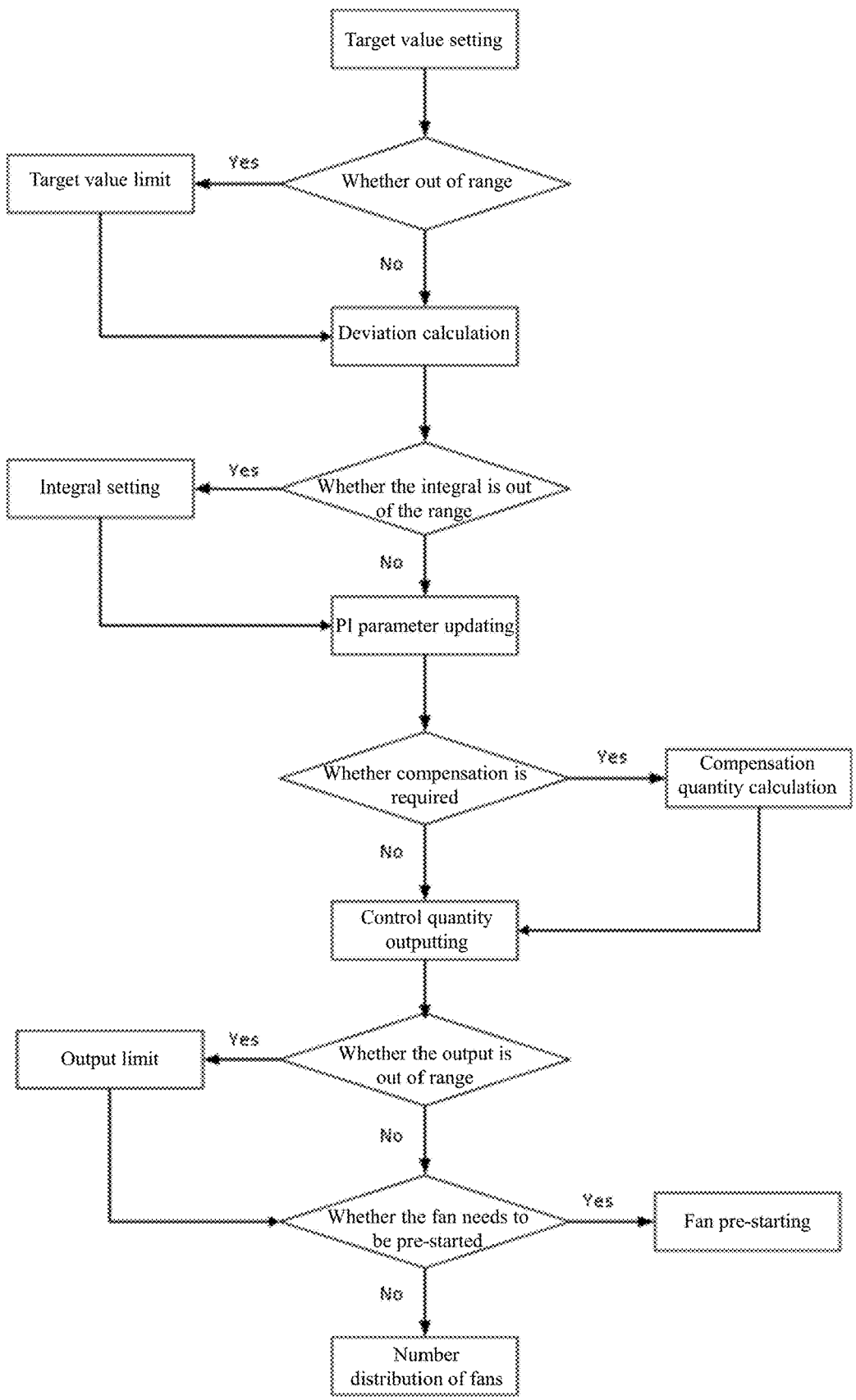
FIG. 2 is a principle diagram of a fan control algorithm of an embodiment of the present invention.
Figure 3:
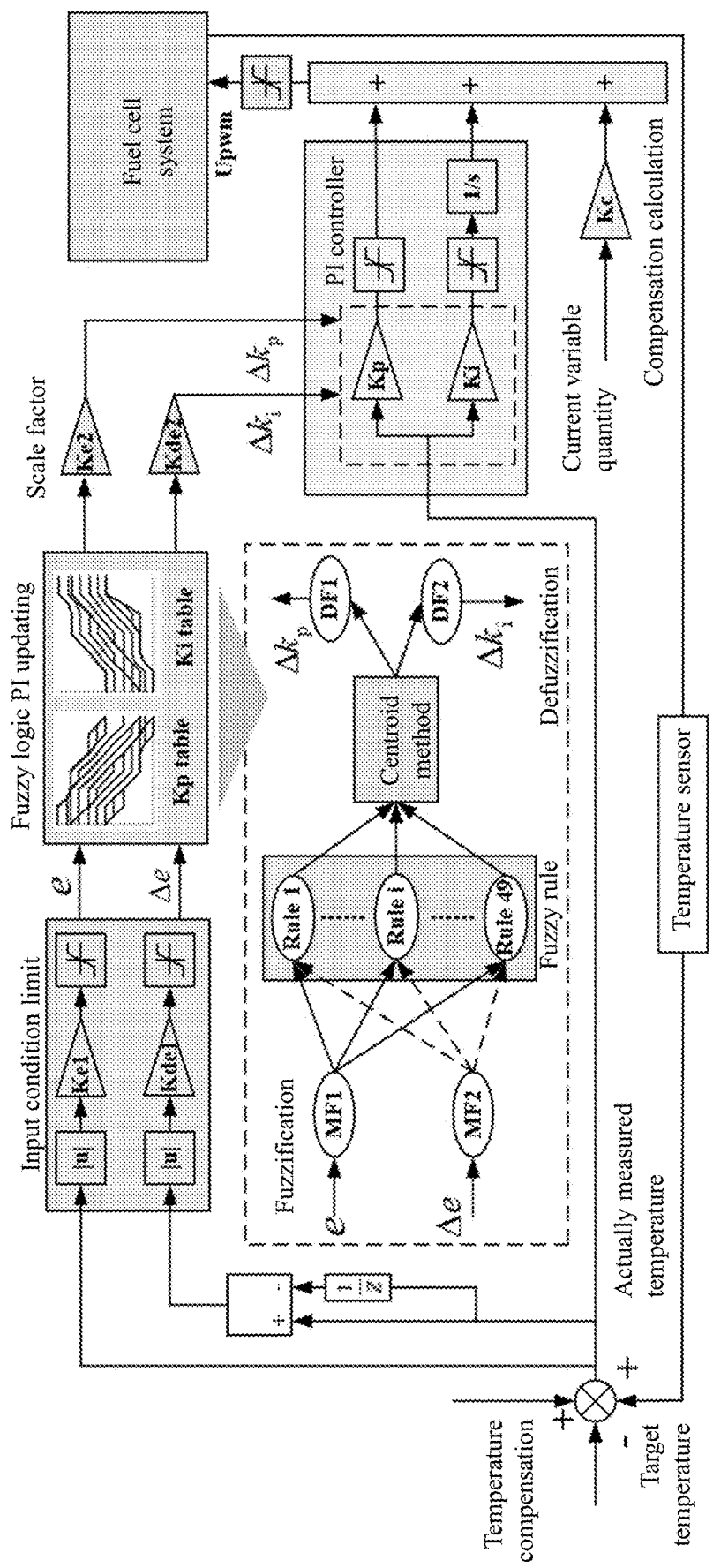
FIG. 3 is a logic block diagram of a fan control opening degree calculation algorithm in an embodiment of the present invention.

In the step S3, the main control object is the rotation speed of the cooling fan, and the implementation steps are as shown in FIG. 2, mainly including PI control module tuning, compensation calculation, control quantity output, fan pre-starting, fan distribution and the like, specifically as follows:

(1) fuzzy PI control module tuning: aiming at a nonlinear time-varying system, a derivation module is easy to introduce high-frequency measurement noise, and a filtering time constant is difficult to determine. Therefore, in the embodiment, the PI control module does not contain the derivation module to guarantee stability of a closed-loop control system, specifically as follows:

the fuzzy PI control module comprises a proportional integral PI module and a fuzzy logic module;

the proportional integral PI module is basic framework of the whole control algorithm, and is used for calculating a control quantity of an actuator, i.e., a rotation speed of the cooling fan, as shown in FIG. 3, the specific expression is as shown in (1):

$$u(t)_{PI}=k_p e(t)+k_i \int_0^t e(t)dt \quad (1)$$

wherein $u(t)_{PI}$ is control output calculated by the proportional integral PI module, e(t) is a difference value between the target temperature and the actually measured temperature, $k_p$ and $k_i$ are a proportional gain and an integral gain respectively.

The fuzzy logic module is used for adjusting PI parameters in real time according to the temperature deviation and variable quantity of the temperature deviation to improve a response speed and control accuracy of the PI control module, an input thereof is temperature deviation e of the target temperature and the actually measured temperature and the variable quantity $\Delta$e of the temperature deviation, input membership function is described by a triangular distribution, an output of the fuzzy logic module is a proportional parameter correction $\Delta k_p$ and an integral parameter correction $\Delta k_i$, an output membership function is described by Gaussian distribution, and a centroid method is adopted for output calculation.

To ensure that the temperature is not excessively overshoot in the heating process, a larger proportional parameter is generally selected at the initial moment; however, the temperature cannot be close to the target temperature due to the overlarge proportional parameter, so that the larger proportional parameter cannot be selected when the deviation value is small. Hereby, the fuzzy rule between the input and the output employs a rule in Table 1. Wherein NB denotes negative large, NM denotes negative medium, NM denotes negative small, ZO denotes zero, PS denotes positive small, PM denotes positive medium, and PB denotes positive large.

Table 1 PI Fuzzy Logic Control Rule Table

Proportional correction $\Delta k_{p\_FL}$ and proportional parameter correction $\Delta k_{i\_FL}$ output by the fuzzy logic module are summed with fixed proportional parameters $k_{p\_c}$ and integral parameters $k_{i\_c}$ calibrated in advance, i.e., the proportional integral parameters in the proportional integral PI module are corrected in real time based on an output result of the fuzzy logic module, with expressions as follows:

$$k_p=k_{p\_c}+\Delta k_{p\_FL} \quad (2)$$

$$k_i=k_{i\_c}+\Delta k_{i\_FL} \quad (3)$$

wherein, in consideration of large difference value between the target temperature and the actually measured temperature in the warming-up starting process, if the integral module is started at the moment, the error can be continuously accumulated to cause serious lagging in fan start-up. To reduce error accumulation, an integral separation method is introduced into the proportional integral module PI. To this end, the integral in the PI module is separated in the initial warming-up process, with specific methods as follows:

1) setting a threshold value ε for controlling the deviation according to actual system control requirements;

2) when the target temperature is the initial warming-up temperature and the difference value between the target temperature and the actually measured temperature is greater than the threshold value ε, adopting proportional control to avoid adverse impact of the integral as well as make the system have faster dynamic response; and in addition, in the target temperature reduction process, to avoid downward overshoot of the temperature, not starting the proportional integral PI module in the cooling process, maintaining a current opening degree of the fan unchanged until the difference value between the actually measured temperature and the target temperature is less than a certain threshold value, and then starting the proportional integral PI module to adjust a rotation speed of the fan in real time.

(2) Compensation calculation: compensation is mainly applied to a working condition with great load current change, the rotation speed of the fan can be adjusted in advance to avoid temperature overshoot. Due to small range of change of the current, the proportional-integral PI module can perform adjustment by itself, so that the compensation effect is not started when the current changes in a small range. By taking the situation that control quantity is compensated by taking 10 A as a current change threshold value as an example, i.e., when the load current change of the fuel cell engine is more than the threshold value, a feedforward compensation effect is adopted.

The current is regarded as disturbance for compensation control calculation. The current I is obtained by table look-up according to a current power demand, and when the compensation action needs to be started, the disturbance-based feedforward compensation control expression is as follows:

$$u(t)_{fed}=k_c I \quad (4)$$

Wherein $k_c$ is a feedforward control parameter, and the specific feedforward control coefficients need to be judged and calibrated according to different current magnitudes of an actual system at present. Then, as shown in FIG. 3, a compensation calculation result is integrated with an output result of a fuzzy logic module.

Hereby, the total opening degree output control expression of the fan is as follows:

$$u(t)=k_c I+(k_{p\_c}+\Delta k_{p\_FL})e(t)\pm(k_{i\_c}+k_{i\_FL})\int_0^t e(t)dt \quad (5)$$

(3) Control quantity output: before inputting a calculated total opening degree output control value of the cooling fan to a controller of a cooling subsystem, the total opening degree control output quantity of the cooling fan needs to be limited to prevent the total opening degree control output quantity from exceeding the upper output quantity limit capable of being reached by the fan. In the embodiment, the power of the fuel cell system is 90 kW, eight cooling fans need to be adopted, and the upper control duty ratio of each cooling fan is 90%, i.e., the fan output upper limit of the whole fuel cell engine is 720%.

(4) Fan pre-starting: in the warming-up process, as shown in FIG. 3, an extra pre-starting temperature compensation value is added after evaluating a difference between the target temperature and the actually measured temperature, the extra pre-starting temperature compensation value is input to the fuzzy logic module together with the difference value for calculation, due to the fact that the fan has a relatively serious lagging characteristic, this step is to start the fan in advance in the warming-up process to prevent the temperature from upward overshoot.

(5) Fan distribution: the output duty ratio needs to be averagely distributed, if some fans are kept started all the time, then other fans need to be frequently started and turned off, resulting in non-uniform service life of the fans. To guarantee the service life consistency of the fans, the following fan distribution rule is adopted. For example, when the total calculated opening degree of the fan is 3%, no any fan needs to be started; when the total calculated opening degree of the fan is 10%, No. 1 fan needs to be started, and the opening degree of the No. 1 fan is 10%; when the total calculated opening degree of the fan is 40%, No. 1 and No. 5 fans need to be started, and the opening degree of each fan is 20%, and so on. (The engine in the embodiment is provided with two coolers, each cooler having four fans).

TABLE 2

Fan distribution rule table

| PI output duty ratio | Duty ratio of each fan | Number of started fans | Serial number of started fans |
|---|---|---|---|
| 0 <= D < 5% | 0 | 0 | — |
| 5 <= D < 15% | 15% | 1 | 1 |
| 15% <= D < 30% | D | 1 | 1 |
| 30% <= D < 60% | D/2 | 2 | 1, 5 |
| 60% <= D < 90% | D/3 | 3 | 1, 5, 2 |
| 90% <= D < 120% | D/4 | 4 | 1, 5, 2, 6 |
| 120% <= D < 150% | D/5 | 5 | 1, 5, 2, 6, 3 |
| 150% <= D < 180% | D/6 | 6 | 1, 5, 2, 6, 3, 7 |
| 180% <= D < 210% | D/7 | 7 | 1, 5, 2, 6, 3, 7, 4 |
| 210% <= D < 240% | D/8 | 8 | 1, 5, 2, 6, 3, 7, 4, 8 |

Step S4, the control signal is input to the actuator through a control unit of the fuel cell system to control a coolant inlet temperature of the cell stack. The above is only a preferred embodiment of the present invention and is not intended to limit the present invention in other forms, any skilled person familiar with the present professional may change or modify the technical content disclosed above to an equivalent embodiment with an equivalent change to be applied to other fields. However, any simple modifications, equivalent changes and adaptations made to the above embodiments according to the technical essence of the present invention without departing from the content of the technical solution of the present invention still fall within the scope of protection of the technical solution of the invention.

What is claimed is:
1. A temperature control method for a vehicular proton exchange membrane fuel cell system, comprising the following steps:
 step S1: measuring a coolant inlet temperature of a cell stack;
 step S2: evaluating a difference between a target coolant inlet temperature and an actually measured coolant inlet temperature to obtain a temperature deviation value;
 step S3: inputting the temperature deviation value and the actually measured coolant inlet temperature into a proportional integral (PI) control module to obtain a control quantity of a cooling fan, wherein the control quantity comprises a rotation speed of the cooling fan, and the PI control module comprises a proportional integral PI module and a fuzzy logic module specifically as follows:
 the proportional integral PI module is used for obtaining the rotation speed of the cooling fan by calculation, and the fuzzy logic module is used for adjusting PI parameters in real time according to the temperature deviation value and a variation quantity of the temperature deviation value, an input membership function of the fuzzy logic module is described by a triangular distribution, an output of the fuzzy logic module is a proportional parameter correction and an integral parameter correction, an output membership function is described by a Gaussian distribution, and a centroid method is adopted for the calculation of the output; and
 step S4: inputting the control quantity of the cooling fan obtained in the step S3 into a cooling system controller through a control unit of a fuel cell system to achieve temperature control of the fuel cell system, wherein
 in the step S3, in consideration of a large difference value between the target coolant inlet temperature and the actually measured coolant inlet temperature in an initial warming-up process, the following processing is specifically conducted:
 introducing an integral separation method in the proportional integral PI module to separate an integral in the proportional integral PI module in the initial warming-up process, specifically as follows:
 1) Setting a threshold value ε for controlling the temperature deviation value according to actual system control requirements;
 2) when the target coolant inlet temperature is an initial warming-up temperature and the difference value between the target coolant inlet temperature and the actually measured coolant inlet temperature is greater than the threshold value ε, adopting a proportional control; and
 3) In a target coolant inlet temperature reduction process, not starting the proportional integral PI module in the cooling process, maintaining a current opening degree of the cooling fan unchanged until the difference value between the actually measured coolant inlet temperature and the target coolant inlet temperature is less than a certain threshold value, and then starting the proportional integral PI module to adjust the rotation speed of the cooling fan in real time.

2. The temperature control method for the vehicular proton exchange membrane fuel cell system according to claim 1, wherein,
 in the step S3, the rotation speed is regulated in advance through the cooling fan under a working condition that a load current changes is greater than 10 A, the load current is regarded as disturbance to be used for a compensation calculation, and then a compensation calculation result is integrated with the output of the fuzzy logic module:
 when a compensation action needs to be started, a disturbance-based feedforward compensation control expression is as follows:

$$u(t)_{fed} = k_c I$$

wherein $k_c$ is a feedforward control parameter;
 a total opening degree output control expression of the cooling fan is as follows:

$$u = k_c I + (k_{p\_c} + \Delta k_{p\_FL})e(t) + (k_{i\_c} + \Delta k_{i\_FL})\int_0^t e(t)dt$$

3. The temperature control method for the vehicular proton exchange membrane fuel cell system according to claim 2, wherein, in the step S3, before inputting an obtained total opening degree output control value of the cooling fan into a controller of a cooling subsystem, a total opening degree control output quantity is limited, so that an upper control duty ratio of each cooling fan is 90%.

4. The temperature control method for the vehicular proton exchange membrane fuel cell system according to claim 1, wherein, the step S3 further comprises a step of distributing the cooling fans, so that the output duty ratio is averagely distributed, with specific principles as follows:

when a PI output duty ratio D is that D is equal to or greater than 0 and is less than 5%, no cooling fan is started;

when the PI output duty ratio is that D is equal to or greater than 5 and is less than 15%, the duty ratio of each cooling fan is 15%, and one cooling fan is started;

when the PI output duty ratio is that D is equal to or greater than 15% and is less than 30%, the duty ratio of each cooling fan is D, and one cooling fan is started;

when the PI output duty ratio is that D is equal to or greater than 30% and is less than 60%, the duty ratio of each cooling fan is D/2, and two cooling fans are started;

when the PI output duty ratio is that D is equal to or greater than 60% and is less than 90%, the duty ratio of each cooling fan is D/3, and three cooling fans are started;

when the PI output duty ratio is that D is equal to or greater than 90% and is less than 120%, the duty ratio of each cooling fan is D/4, and four cooling fans are started;

when the PI output duty ratio is that D is equal to or greater than 120% and is less than 150%, the duty ratio of each cooling fan is D/5, and five cooling fans are started;

when the PI output duty ratio is that D is equal to or greater than 150% and is less than 180%, the duty ratio of each cooling fan is D/6, and six cooling fans are started;

when the PI output duty ratio is that D is equal to or greater than 180% and is less than 210%, the duty ratio of each cooling fan is D/7, and seven cooling fans are started; and when the PI output duty ratio is that D is equal to or greater than 210% and is less than 240%, the duty ratio of each cooling fan is D/8, and eight cooling fans are started.

* * * * *